(12) United States Patent
Snyder (10) Patent No.: US 6,952,778 B1
(45) Date of Patent: Oct. 4, 2005

(54) PROTECTING ACCESS TO MICROCONTROLLER MEMORY BLOCKS

(75) Inventor: Warren Snyder, Snohomish, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 669 days.

(21) Appl. No.: 09/855,868

(22) Filed: May 14, 2001

Related U.S. Application Data (60) Provisional application No. 60/243,708, filed on Oct. 26, 2000.

(51) Int. Cl.[7] .............................. H04L 9/00; H04L 9/32; G06F 12/00
(52) U.S. Cl. ...................... 713/200; 713/201; 713/202; 713/193; 711/163; 711/164
(58) Field of Search ................................ 713/200, 201, 713/202, 193; 711/163, 164

(56) References Cited

U.S. PATENT DOCUMENTS

| | | | |
|---|---|---|---|
| 5,202,687 A | 4/1993 | Distinti | 341/158 |
| 5,737,760 A * | 4/1998 | Grimmer et al. | 711/163 |
| 6,003,133 A * | 12/1999 | Moughanni et al. | 713/200 |
| 6,144,327 A | 11/2000 | Distinti et al. | 341/126 |
| 6,339,815 B1 * | 1/2002 | Feng et al. | 711/163 |

OTHER PUBLICATIONS

Atmel Corporation: AT90SC Summay: "Secure Microcontrollers for Smart Cards", Oct. 1999, pp. 1-7.*

* cited by examiner

Primary Examiner—Matthew Smithers
Assistant Examiner—Courtney Fields
(74) Attorney, Agent, or Firm—Wagner, Murabito & Hao LLP (57) ABSTRACT

A microcontroller provides protection to memory blocks in an embedded memory. A set of rules such as security levels mapped to memory blocks are stored in a nonvolatile supervisory memory. An algorithm for application of the rules is stored in a supervisory ROM. When a read or write operation is to be carried out, the rules are applied according to the algorithm in order to authorize or reject the read or write operation. Security levels can be modified, but only according to defined rules. In one embodiment, the security levels can only be increased.

15 Claims, 6 Drawing Sheets

PROTECTING ACCESS TO MICROCONTROLLER MEMORY BLOCKS

CROSS REFERENCE TO RELATED DOCUMENTS

This application is related to and claims priority benefit of U.S. Provisional Patent Application Ser. No. 60/243,708, filed Oct. 26, 2000 to Snyder, et al. which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of memory security, for example in microcontrollers and the like. More particularly, this invention relates to a method and apparatus for mapping memory blocks to security levels to limit access thereto and for modifying such security levels.

BACKGROUND OF THE INVENTION

Figure 1:
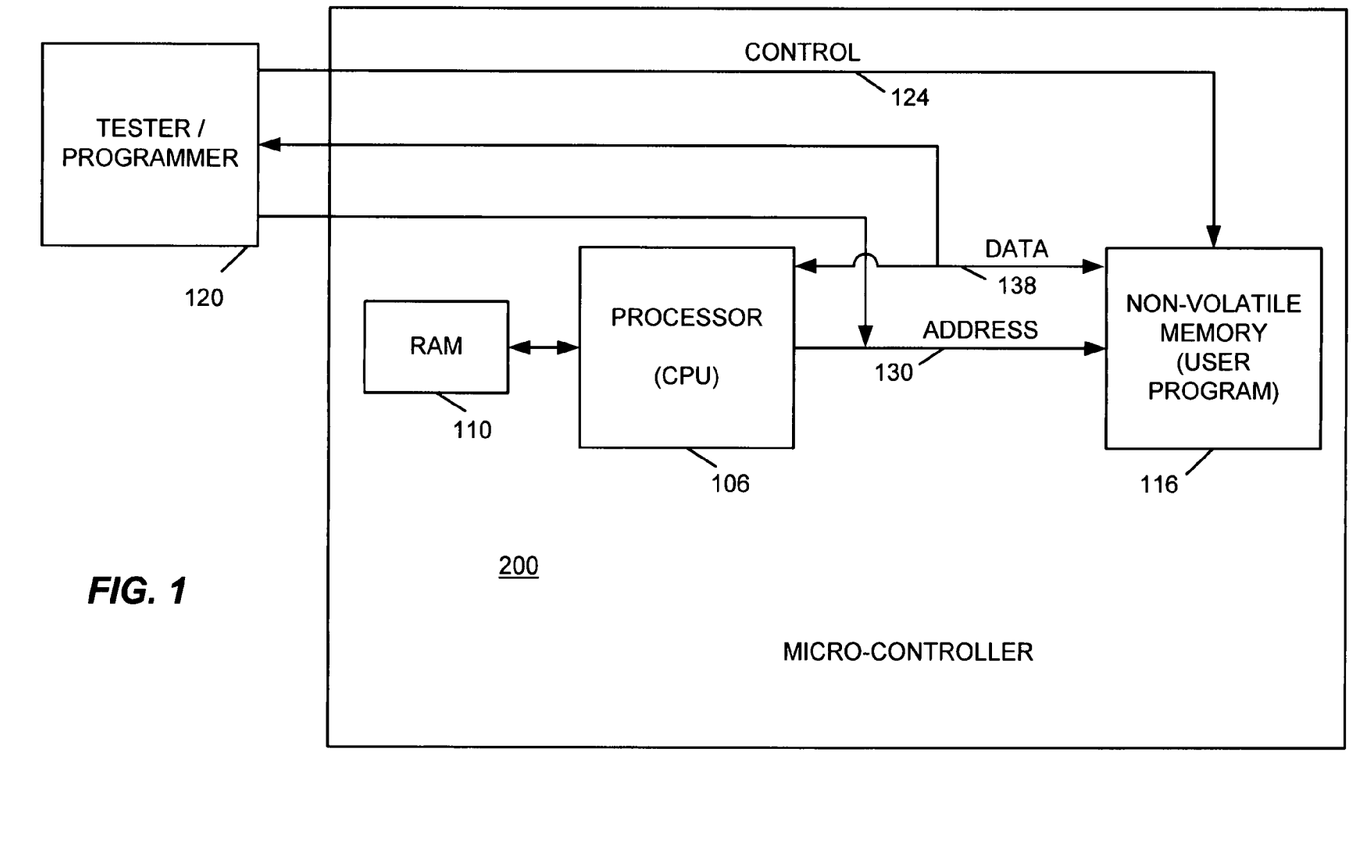
FIG. 1 is a block diagram illustrating a conventional microcontroller with external access to memory.

Microcontrollers such as 100 depicted in FIG. 1, generally include a processor (Central Processing Unit) 106 and associated Random Access Memory (RAM) 110 as well as a block of nonvolatile memory 116, generally flash memory, used to store a user program. By using a block of user programmable nonvolatile memory 116, the microcontroller may be customized to carry out any desired function within the capabilities of the device. Numerous techniques exist for programming the user program into the nonvolatile memory 116. In general, such techniques may be characterized by use of an external tester/programmer 120 coupled directly to the nonvolatile memory 116. The tester/programmer 120 utilizes a control signal line 124 to appropriately signal the nonvolatile memory 116 (as well as associated circuitry within the microcontroller 100) that a programming mode is being entered. An address line, path or bus 130 is then used to identify memory locations within the nonvolatile memory 116 being programmed. Data is transmitted to the nonvolatile memory 116 over a data line, path or bus 138. When all address locations have been appropriately programmed within the nonvolatile memory 116, the tester/programmer 120 issues appropriate control signals on control path 124 to terminate the programming process. Thus, the tester/programmer 120 can directly manipulate the memory 116 with nothing to prevent unauthorized tampering with or copying the memory content.

The details of the exact programming process vary from manufacturer to manufacturer and from part to part. However, the above characterization generally describes the process used. Unfortunately, the process of programming the microcontroller 100 as depicted in FIG. 1 presents a number of problems. The need to bring control data and address lines to the outside requires that the microcontroller 100 frequently have more I/O (input/output) pads on the processor then might otherwise be necessary. In addition, the external accessibility to control path 124, address path 130 and data path 138 renders microcontroller 100 susceptible to unauthorized memory reads, programming or reprogramming. This may present a serious security problem making microcontroller 100 vulnerable to unauthorized modification of a user program including potentially infecting the user program with "bugs" and "viruses".

SUMMARY OF THE INVENTION

The present invention relates generally to controlling access to memory blocks. Objects, advantages and features of the invention will become apparent to those skilled in the art upon consideration of the following detailed description of the invention.

In one embodiment of the present invention a microcontroller provides protection to memory blocks in an embedded memory. A set of rules such as security levels mapped to memory blocks are stored in a nonvolatile memory. An algorithm for application of the rules is stored, for example, in a supervisory ROM. When a read or write operation is to be carried out, the rules are applied according to the algorithm in order to authorize or reject the read or write operation. Security levels can be modified, according to defined rules. In one embodiment, the security levels can only be increased. This provides many advantages including the advantages that the memory security cannot be decreased below a default value established by the user. and intruders may be thwarted from attempts to modify the memory content in secure memory blocks.

In a microcontroller consistent with embodiments of the present invention, a method of accessing a block of memory includes, in response to an access request to the block of memory, ascertaining a security rule associated with the block of memory; applying the security rule according to a security algorithm to determine if the access request is authorized; and denying the access request in the event the access request is unauthorized.

In a microcontroller having an internal processor, a method of accessing memory according to other embodiments of the invention includes mapping a security level to each block of a plurality of memory blocks and storing the mapping in a table; in response to an access request to a specified block of memory, determining the security level for the specified block of memory; applying the a security algorithm using the security level to determine if the access request is authorized by the algorithm; and denying the access request in the event the access request is unauthorized.

In a microcontroller, a method of controlling secure access to memory according to other embodiments of the invention include, in response to a request to change a security rule for a block of memory, determining if the change in the security rule for the block of memory is authorized; and denying the request in the event the request is unauthorized.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Protecting Access to Microcontroller Memory Blocks in Accordance with the Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 2:
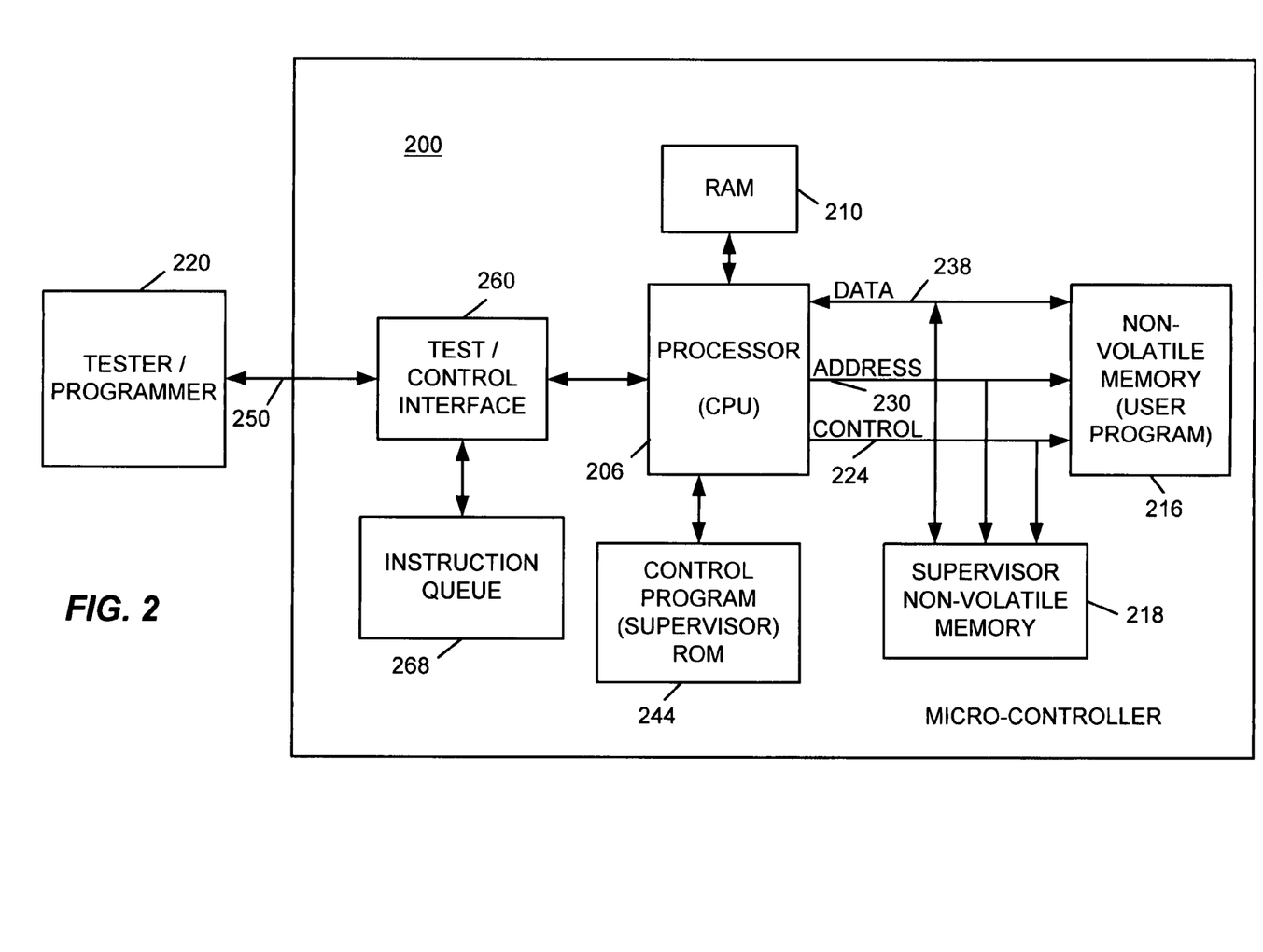
FIG. 2 is a block diagram of a microcontroller consistent with an embodiment of the present invention.

Referring now to FIG. 2, a microcontroller 200 consistent with an embodiment of the present invention is illustrated in which processor 206 is coupled to internal Random Access Memory (RAM) 210. Nonvolatile memory 216 (e.g., Flash memory) for storing a user program is connected to the processor 206 internally. In addition, a supervisor nonvolatile memory 218 is also connected to processor 206. A control path 224 is provided from processor 206 to nonvolatile memory 216 and 218. In addition, conventional address path 230 and data path 238 from processor 206 to memory 216 and 218 is provided. In addition to the RAM 210 and nonvolatile memories 216 and 218, microcontroller 200 includes a control program ROM (a supervisor ROM) 244 that contains hard-coded instructions used by processor 206 to directly program memory locations of nonvolatile memory 216. Thus, all programming of nonvolatile memory 216 is carried out by an internally stored process executing as a program on processor 206.

A tester/programmer 220 may be coupled to microcontroller 200 via a path 250 which, in the preferred embodiment, is a two wire bus carrying control, address and data information to an internal test/control interface 260. The test/control interface 260 is coupled to processor 206 to provide the processor with program instructions and other test and control function instructions from the tester/programmer 220. Instructions from the tester/programmer 220 are stored in an instruction queue 268 for sequential retrieval and execution by processor 206.

The user program is stored in nonvolatile memory 216 which is arranged in memory blocks. In one embodiment, this memory 216 provides 16 Megabytes of storage for user program and is divided into 256 memory blocks. Of course, this particular arrangement is to be considered exemplary since any other arrangement could also be used with the present invention.

The supervisory nonvolatile memory 218 contains a table mapping a security level for each of the memory blocks in the user program nonvolatile memory 216. In one embodiment, four security levels 0 through 3 are defined as illustrated in TABLE 1 below.

TABLE 1

| Security Level | Definition |
| --- | --- |
| 0 | unsecure - no read protect, no write protect |
| 1 | read protect, write protect, processor can self modify |
| 2 | read protect, no processor self modify, no write protect |
| 3 | full read protect, full write protect |

According to this security definition, security level 0 is the least secure and security level 3 is the most secure. It is, however, somewhat ambiguous whether security level 2 is more or less secure than security level 1, since the actual security of these middle levels is somewhat application dependent. In this embodiment, the security levels may be defined by setting two bits in a memory table. The number of bits can be adjusted if more or fewer security levels are to be used.

The supervisor nonvolatile memory 218 stores a table similar to TABLE 2 below to define the security level of each of the 256 blocks of memory 216. The security levels presented are presented for illustrative purposes and do not represent a default security level or have any other particular significance.

TABLE 2

| Block Number | Security Level |
| --- | --- |
| 0 | 3 |
| 1 | 2 |
| 2 | 1 |
| 3 | 1 |
| 4 | 0 |
| ... | ... |
| 255 | 2 |

In this example, block 0 is shown to have the highest security level, while block 4 has the lowest security level. Blocks 1 and 255 have security level 2 and blocks 2 and 3 have security level 1. In accordance with embodiments of the present invention, these security levels are programmed at the time of manufacture in accord with the end user's requirements. The security levels can subsequently be changed under certain circumstances either by programming using tester/programmer 220 or through actions of processor 206 operating under program control. However, as a security measure, the security levels can only be changed in a prescribed manner.

In general, in accordance with embodiments of the present invention, the security levels assigned to the memory blocks can only be changed under control of an algorithm stored in the supervisor ROM 244 in accordance with rules stored in the supervisor nonvolatile memory 218. Such rules in memory 218, in accordance with one embodiment define the security levels and permissible transitions in security levels as will be described later. However, in general, passwords, unique identifications for users, encryption and other security measures could equally well be applied using the general principles of the present invention.

Consistent with the exemplary embodiment shown, the security level can only be increased, not decreased. In the present example, wherein there exists ambiguity in the absolute security of intermediate security levels, changing from one intermediate level to the other is not permitted. Thus, the permissible transitions in security levels is described in TABLE 3 below for the current example. Those skilled in the art will appreciate that a greater or lesser number of security levels and differing security definitions can be utilized without departing from the present invention.

TABLE 3

| Security Transition | Transition Allowed? |
| --- | --- |
| 0 to 1 | YES |
| 0 to 2 | YES |
| 0 to 3 | YES? |

TABLE 3-continued

| Security Transition | Transition Allowed? |
| --- | --- |
| 1 to 0 | NO? |
| 1 to 2 | NO |
| 1 to 3 | YES |
| 2 to 0 | NO? |
| 2 to 1 | NO |
| 2 to 3 | NO? |
| 3 to 0 | NO? |
| 3 to 1 | NO? |
| 3 to 2 | NO? |

In one embodiment, these permissible transitions, as defined in TABLE 3, can be hard coded within the algorithm in supervisor ROM 244 or may form a type of rule defined by the supervisor nonvolatile memory 218 that is referenced in carrying out the security measures of the present invention.

By way of example of an embodiment of the invention, the security level of memory block 4 is initially assigned as 0. The security level could be increased to level 2 by action of tester/programmer 220 and then subsequently increased to security level 3 by action of the tester/programmer. Once the security level reaches the highest level (3 in this example), it cannot be modified. At this point, the only way to modify the security level to reduce it is to erase the supervisor nonvolatile memory 218 and re-initialize the microcontroller. This action will result in the user defined default security levels being restored. In this case, the security level of memory block 4 would obviously return to 0 since there is no way to reach this insecure level except by it being so defined as a user default.

Figure 3:
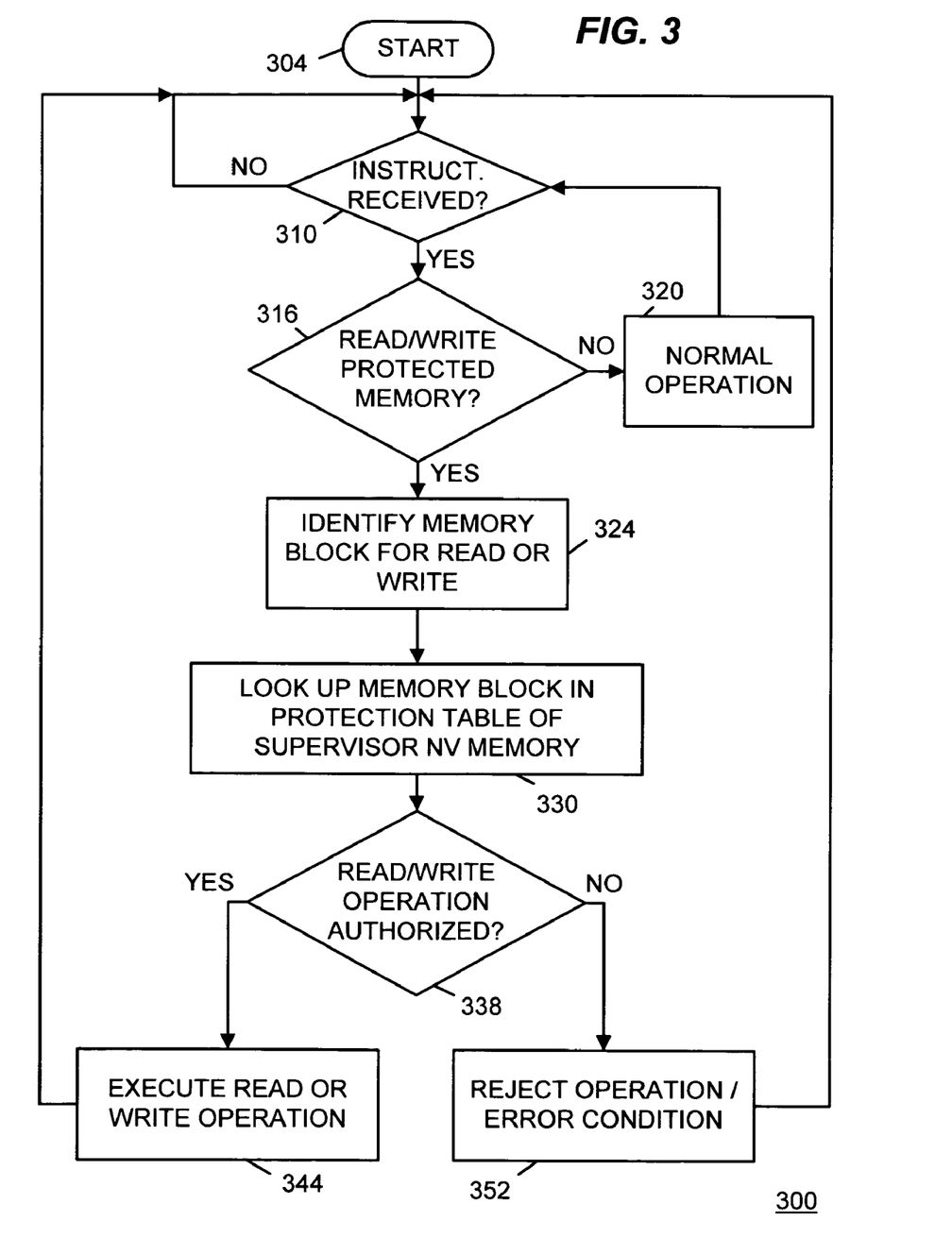
FIG. 3 is a flow chart describing a process of accessing protected memory blocks consistent with an embodiment of the invention.

Referring now to FIG. 3, a process 300 of providing security to memory blocks within nonvolatile memory 216 in accordance with an embodiment of the present invention starts at 304. When an instruction is received at 310, it is determined at 316 whether the instruction is a read or write operation to a protected memory block within nonvolatile user memory 216. If not, normal processing of the instruction is carried out at 320 and control returns to 310 to await the next instruction. However, if the instruction is a read or write instruction to protected memory 216 at 316 control passes to 324 where the memory block is identified for the read or write operation.

At 330, the memory block is looked up in the protection table of supervisory nonvolatile memory 218. The processor 206 then determines through the supervisor programs stored in supervisor ROM 244 whether or not the read or write operation is authorized at 338 based upon the security algorithm residing in ROM 244 and the rules defined in memory 218. If the read or write operation is authorized at 338, then the operation is executed at 344 and control returns to 310. However, in the event the operation is not authorized at 338, the operation is rejected and an error condition exists at 352. Any number of actions can take place as a result of such an error condition at 352 including shutdown of the microcontroller 200, presenting an error message, presenting an alert or any other suitable action. In certain embodiments, control may then be passed from 352 back to 310 to await the next instruction.

Figure 4:
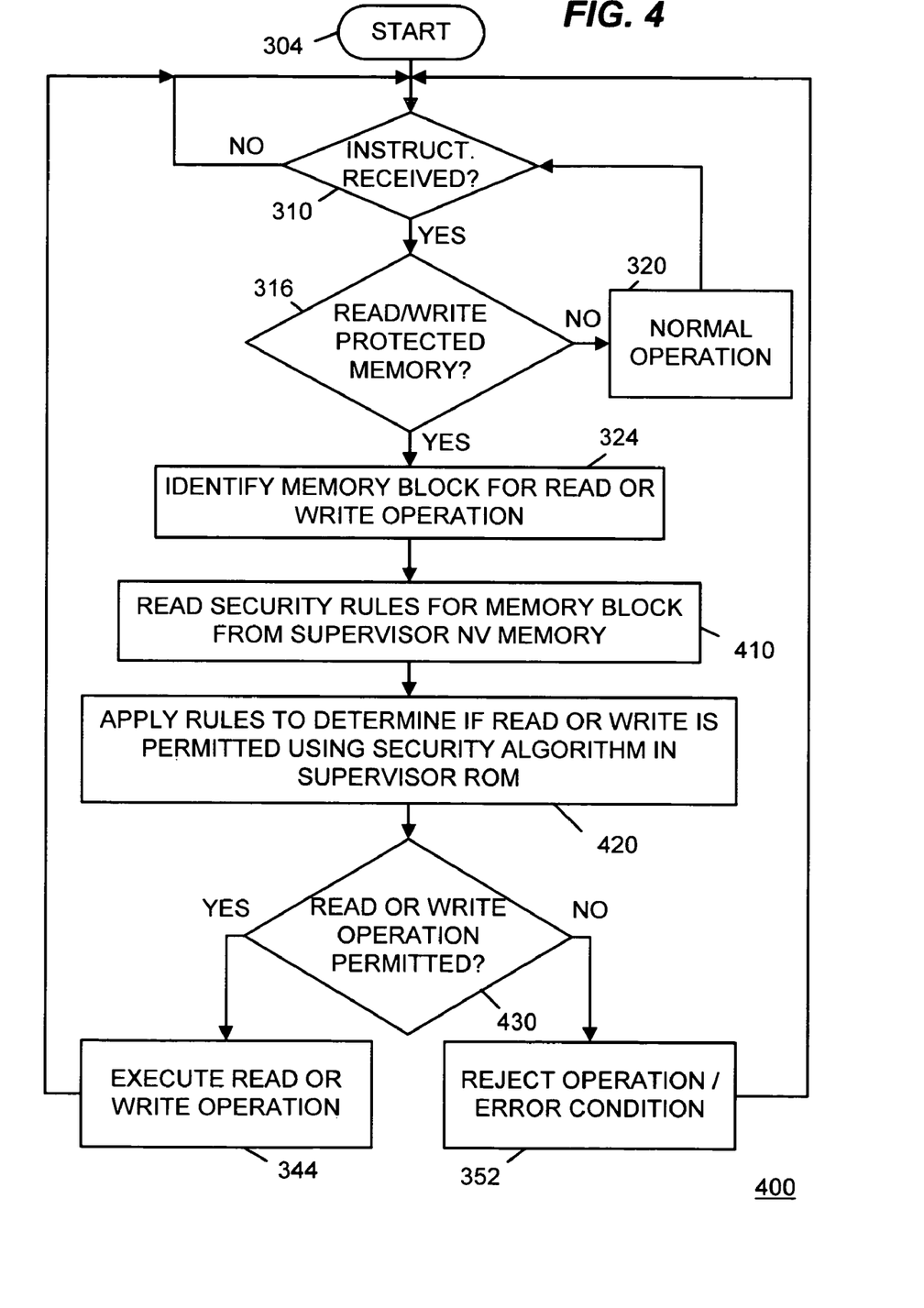
FIG. 4 is a flow chart describing another process of accessing protected memory blocks consistent with an embodiment of the invention.

Process 300 of FIG. 3 can be generalized as process 400 of FIG. 4. When an instruction is received at 310, it is determined at 316 whether the instruction is a read or write operation to a protected memory block within nonvolatile user memory 216. If not, normal processing of the instruction is carried out at 320 and control returns to 310 to await the next instruction. However, if the instruction is a read or write instruction to protected memory 216 at 316 control passes to 324 where the memory block for the read or write operation is identified. At 410, security rules for the identified memory block are read from the supervisory nonvolatile memory 218. These rules are applied to determine if the read or write operation is permitted using the security algorithm stored in supervisory ROM 244 at 420. If, upon applying the rules using the security algorithm, the read or write operation is permitted at 430, then the read or write operation is executed at 344 and control returns to 310 to await the next instruction. However, if the read or write operation is not permitted at 430, the operation is rejected and an error condition exists at 352.

Figure 5:
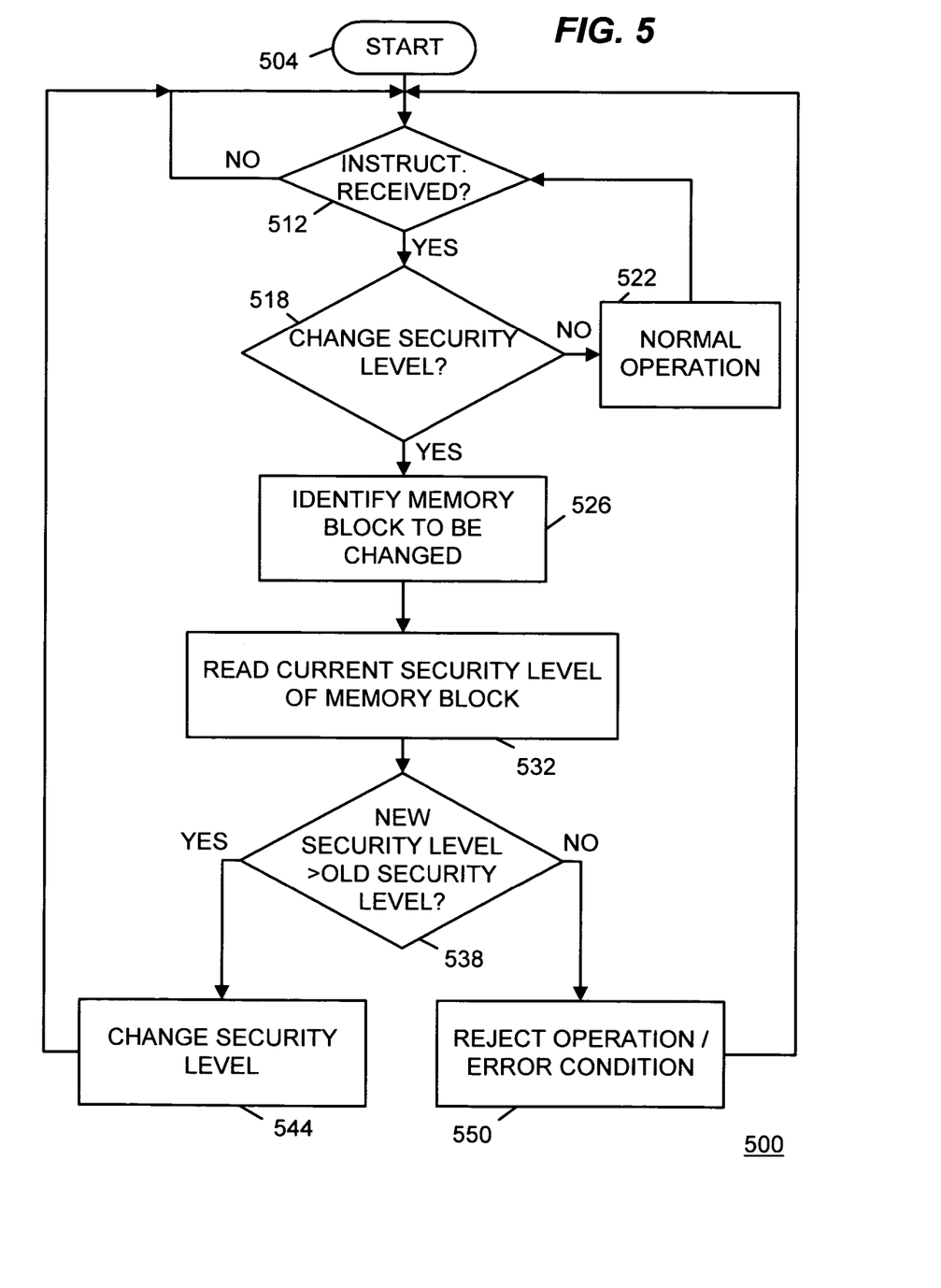
FIG. 5 is a flow chart describing a process of modifying security levels for memory blocks consistent with an embodiment of the present invention.

As described previously, the security level for any given memory block within the nonvolatile user memory 216 can be modified by action of processor 206 under program control or under control of tester/programmer 220. One embodiment of a process used to determine whether or not a transition in security level is permitted is illustrated as process 500 of FIG. 5 which starts at 504. When an instruction is received at 512, processor 206 determines if the instruction is for a change in security level at 518. If not, normal operation proceeds at 522 and control returns to 512 to await the next instruction (either from tester programmer 220 or by operation of another program on processor 206). If, at 518, the instruction directs a security level change, the memory block to be changed is identified at 526 and the current security level of the memory block is read at 532 from the supervisor nonvolatile memory 218. In the current exemplary embodiment, transitions in security level are only permitted if a transition increases security. Therefore, at 538 the current security level and the proposed new security level are examined to determine if the new security level is higher than the old level. If so, the security level is modified at 544 and control returns to 522. If, however, the new security level is not higher than the old security level at 538, the change is rejected and an error condition is flagged at 550. Depending on the nature of the operational program of the microcontroller 200, such error conditions can result in any number of operational steps including disabling the microcontroller 200.

Figure 6:
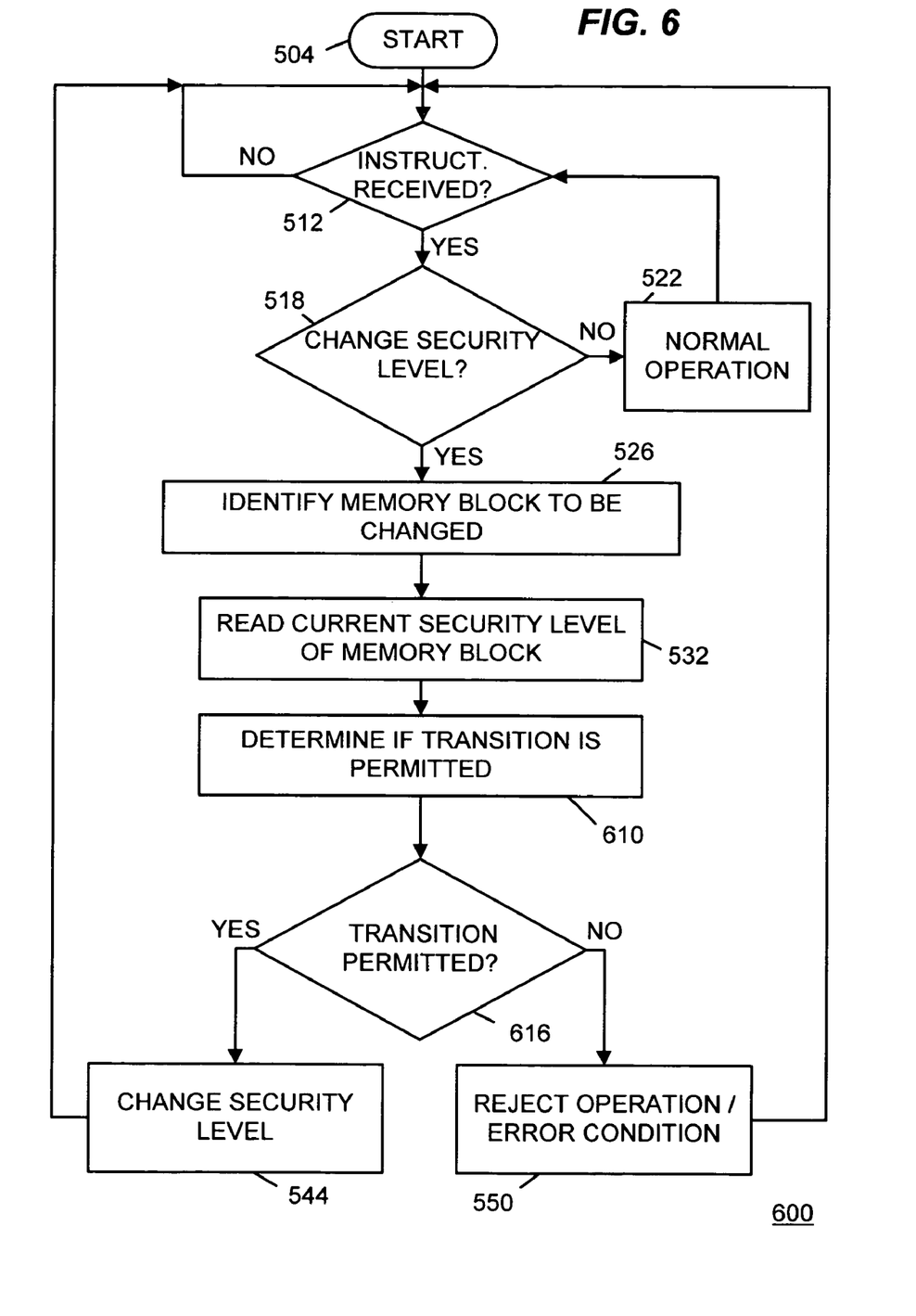
FIG. 6 is a flow chart describing another process of modifying security levels for memory blocks consistent with an embodiment of the present invention.

In the above example, it is presumed that a hierarchy of security levels is established so that it is clear that there is a higher level of security for one security level than for another in all cases. However, the above process can be generalized by process 600 of FIG. 6. When an instruction is received at 512, processor 206 determines if the instruction is for a change in security level at 518. If not, normal operation proceeds at 522 and control returns to 512 to await the next instruction (either from tester programmer 220 or by operation of another program on processor 206). If, at 518, the instruction directs a security level change, the memory block to be changed is identified at 526 and the current security level of the memory block is read at 532 from the supervisor nonvolatile memory 218. At 610, it is determined if the transition is permitted under the rules and algorithm defined for permissible transitions of security level. If the transition in security level is permitted at 616, then the security level is modified at 544 and control returns to 522. If, however, the transition is not permitted at 616, the change is rejected and an error condition is flagged at 550. Depending on the nature of the operational program of the microcontroller 200, such error conditions can result in any number of operational steps including disabling the microcontroller 200.

In accordance with the above description, the present invention is used to protect memory locations in a nonvolatile user program memory 216. The rules are stored in the nonvolatile supervisory memory 218 and the algorithm for applying the rules is stored in the supervisor ROM 244. However, this arrangement should not be considered limiting since this invention can be configured in other ways without departing from the invention. For example, in one embodiment both the rules and the algorithm could be stored in ROM. In other embodiments, the protected memory could be random access memory or read only memory or nonvolatile Flash memory or a combination thereof. Such embodiments are considered equivalents for purposes of this invention.

Those skilled in the art will recognize that the present invention has been described in terms of exemplary embodiments based upon programming nonvolatile memory within a microcontroller; however, the present invention should not be so limited. The present invention could be implemented using hardware component equivalents such as special purpose processors, micro-processors and the like which are equivalents to the invention as described and claimed.

The present invention is preferably implemented using a programmed processor executing programming instructions that are broadly described above in flow chart form. Such instructions can be stored in any suitable electronic programming medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

The present invention provides enhanced security by virtue of isolating not only the control lines, data lines and address lines of the nonvolatile memory from the tester/programmer but also isolates the tester/programmer from the actual process used to effect the programming or re-programming of the nonvolatile memory 216. Moreover, in order to enter a programming mode, the security procedures described above are used so that only modifications to the content of the nonvolatile memory that are within prescribed security limits can be carried out. Thus, the invention as described provides substantially enhanced security against intruders attempting to program or re-program the nonvolatile memory 216.

Those skilled in the art will recognize that the present invention has been described in terms of exemplary embodiments based upon programming nonvolatile memory within a microcontroller; however, the present invention should not be so limited. The present invention could be implemented using hardware component equivalents such as special purpose processors, micro-processors and the like which are equivalents to the invention as described and claimed. Moreover, although described in connection with programming a nonvolatile memory such as a Flash memory, the technique could equally well be used to program a region of volatile memory such as RAM memory without departing from the present invention. Also, although a two wire bus interface with the tester/programmer is preferred, this is not to be limiting. Although the exemplary embodiment of microcontroller 200 shows memories 216 and 218 sharing the same data, address and control paths, this too should not be considered limiting since other physical arrangements are also possible.

The present invention is preferably implemented using a programmed processor executing programming instructions that are broadly described above in flow chart form. Such instructions may be stored in any suitable electronic programming medium. However, those skilled in the art will appreciate that the processes described above may be implemented in any number of variations and in many suitable programming languages without departing from the present invention. For example, the order of certain operations carried out can often be varied, and additional operations may be added without departing from the invention. Error trapping may be added and/or enhanced and variations may be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. In a microcontroller, a method of accessing a block of memory, comprising:
   in response to an access request to the block of memory, ascertaining a security rule associated with the block of memory;
   applying the security rule according to a security algorithm to determine if the access request is authorized; and
   denying the access request in the event the access request is unauthorized, wherein the security rule comprises one of a plurality of security levels assigned to the block of memory, the security levels corresponding to ability of the processor to read or write to the block of memory.

2. The method according to claim 1, wherein the access request comprises one of a read request and a write request.

3. The method according to claim 1, wherein the memory block comprises one of a plurality of memory blocks.

4. The method according to claim 3, wherein the plurality of memory blocks comprise nonvolatile memory residing on the microcontroller.

5. The method according to claim 1, wherein the security rule comprises one of a plurality of security levels assigned to the block of memory, the security levels defining ability of a programmer to read or write to the block of memory.

6. The method according to claim 1, wherein the security rule comprises one of a plurality of security levels assigned to the block of memory, the plurality of security levels comprising levels which represent progressively greater security against unauthorized access to the block of memory.

7. A microcontroller having an electronic storage medium that stores instructions which, when executed on a processor forming a part of the microcontroller, carry out a process according to claim 1.

8. In a microcontroller having an internal processor, a method of accessing memory, comprising:
   mapping a security level to each block of a plurality of memory blocks and storing the mapping in a table; in response to an access request to a specified block of memory, determining the security level for the specified block of memory; applying the a security algorithm using the security level to determine if the access request is authorized by the algorithm; and denying the access request in the event the access request is unauthorized.

9. The method according to claim 8, wherein the security levels comprise a plurality of levels which represent progressively greater security against unauthorized access to the block of memory.

10. The method according to claim 8, wherein the plurality of memory blocks comprise nonvolatile memory residing on the microcontroller.

11. The method according to claim 8, wherein the table is stored in a supervisory nonvolatile memory on the microcontroller.

12. The method according to claim 8, wherein the security algorithm is stored in a supervisory read only memory on the microcontroller.

13. In a microcontroller, a method of controlling secure access to memory, comprising:
   in response to a request to change a security rule for a block of memory, determining if the change in the security rule for the block of memory is authorized; and
   denying the request in the event the request is unauthorized, wherein the security rule comprises one of a plurality of security levels assigned to the block of memory.

14. The method according to claim 13, wherein the determining comprises authorizing the request to change the security rule if the request comprises a request to increase the security of the block of memory.

15. A microcontroller having an electronic storage medium that stores instructions which, when executed on a processor forming a part of the microcontroller, carry out a process according to claim 13.

* * * * *